United States Patent Office 3,663,622
Patented May 16, 1972

3,663,622
TRANS-ANNULAR SEC-PHOSPHINE
John L. Van Winkle, San Lorenzo, Calif., assignor to Shell Oil Company, New York, N.Y.
No Drawing. Original application Feb. 28, 1968, Ser. No. 708,788, now Patent No. 3,590,087, dated June 29, 1971. Divided and this application Oct. 7, 1970, Ser. No. 86,393
Int. Cl. C07f 9/02
U.S. Cl. 260—606.5 P    2 Claims

ABSTRACT OF THE DISCLOSURE

The novel trans-annular sec-phosphine, hydrocarbyl-(octahydropentalyl-1-)phosphine is used in the selective direct, single-stage production of reaction products consisting predominantly of primary alcohols by reacting an olefinic compound with carbon monoxide and hydrogen at a temperature between about 100° and 300° C. and superatmospheric pressure in the presence of a catalyst of cobalt in complex combination with carbon monoxide and hydrocarbyl(octahydropentalyl-1-)phosphine.

This is a division of applicant's copending application Ser. No. 708,788, filed Feb. 28, 1968, now U.S. Pat. No. 3,590,087.

BACKGROUND OF THE INVENTION

In U.S. Pat. 3,239,569, issued Mar. 8, 1966, to L. H. Slaugh and R. D. Mullineaux, is described a hydroformylation process to effect the direct, single-stage hydroformylation of olefins to a reaction mixture wherein the alcohols predominate over the aldehydes, utilizing a cobalt catalyst comprising cobalt in complex formation with carbon monoxide and a tertiary organophosphine, such as tri-n-butylphosphine. Heretofore, only tert-phosphines have been considered advantageous for use in the process as the required phosphine ligand of the cobalt catalyst complex. Pri- and sec-phosphines, being more reactive species than tert-phosphines, more readily oxidize or degrade in an oxidizing environment, e.g., in the presence of cobalt. The use of primary and secondary phosphines as ligands for the above purpose has been avoided owing to the absence of sufficient stability of the catalyst complexes when the phosphorus-containing ligands are pri- or sec-phosphines.

SUMMARY OF THE INVENTION

It has now been found that an olefinic compound can be converted predominantly to primary alcohols by reacting the olefinic compound—especially an olefinic hydrocarbon—in liquid phase, with carbon monoxide and hydrogen, at a temperature between about 100° and about 300° C. and superatmospheric pressure in the presence of a novel catalyst comprising cobalt in complex combination with carbon monoxide and the novel transannular sec-phosphine, hydrocarbyl (octahydropentalyl-1-)phosphine wherein hydrocarbyl represents a non-acetylenic hydrocarbyl group of 10 to 36 carbon atoms.

DESCRIPTION OF PREFERRED EMBODIMENTS

The novel transannular sec-phosphine, which is a suitable ligand of the novel cobalt-containing catalyst of the present invention, is hydrocarbyl(octahydropentalyl-1-)-phosphine and is represented by the formula

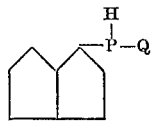

in which Q is a non-acetylenic hydrocarbyl group preferably of 10 to 36 carbon atoms. It is to be understood that in the foregoing graphic formula the line portion in the transannular structure, i.e., of the octahydropentalyl-1-group, represents a conventional organic chemical covalent bond with a saturated carbon atom at each indicated intersection, the saturation being by the required number of hydrogen atoms.

The reaction of primary organic phosphine, $QPH_2$ wherein Q is non-acetylenic hydrocarbyl, with 1,5-cyclooctadiene in the presence of a free radical-generating catalyst and in the absence of substantial amounts of oxygen producing a mixture of 9-hydrocarbyl-9-phosphabicyclo[4.2.1]nonane and 9-hydrocarbyl-9-phosphabicyclo[3.3.1]nonane is described in copending U.S. application of R. F. Mason et al., Ser. No. 468,572, filed June 30, 1965. It has now been found that when that reaction is conducted in the presence of a free radical-generating catalyst which decomposes in the range of 110–150° C. and higher, e.g., in the presence of a dialkyl peroxide, a substantial proportion of hydrocarbyl(octahydropentalyl-1-)phosphine can be isolated as the minor product. The primary organic phosphine reagent useful in the practice of the present invention has the formula $QPH_2$ in which Q represents a non-acetylenic hydrocarbyl group. The term "hydrocarbyl" is used in its accepted meaning as representing a radical formed from a hydrocarbon by removal of a hydrogen atom. The hydrocarbyl groups represented by Q may be any non-acetylenic organic radical composed solely of carbon and hydrogen. The widest variation is possible in that the (non-acetylenic) hydrocarbyl group may be alkyl, alkenyl, cycloalkyl, cycloalkenyl, aryl, aralkyl, alkaryl, single ring, multi-ring, straight chain, branched chain, large or small. Representative hydrocarbyl groups include methyl, ethyl, methallyl, n-butyl, hexyl, isooctyl, dodecyl, oleyl, octadecyl, eicosyl, hexacosyl, octacosyl, triacontyl, hexatriacontyl, tetracontyl, cyclohexyl, cyclooctyl, cyclooctenyl, phenyl, naphthyl, benzyl, phenethyl, and the like. A preferred group of primary phosphines consists of those in which Q is non-acetylenic hydrocarbyl of from 10 to 36 carbons, and especially preferred are those in which Q is from 16 to 30 carbons, since the higher molecular weight reagents, i.e., where Q is 10 carbons and greater, result in a higher molecular weight sec-phosphine (I), which is less volatile and more advantageous for use in the hydroformylation catalyst.

Separation of the hereinabove described phosphine products is accomplished by fractional precipitation by a method utilizing the differences in basicity of the above phosphines and the low solubility of their strong acid salts in inert solvents. Before separation of the phosphines, it is preferable to determine their concentration, for example, by potentiometric titration with perchloric acid using acetic anhydride-toluene solvent. By way of illustration, wtih eicosylphosphine as the $QPH_2$ reactant, a representative phosphine reaction product mixture will contain approximately 84% of the 9-eicosyl-9-phosphabicyclononanes and about 16% of eicosyl(octahydropentalyl-1-)phosphine. The products mixture is then dissolved in an inert neutral solvent, e.g., hexane, and to it is added sufficient strong acid such as perchloric acid, determined by prior titration, to precipitate the phosphine fraction which is the strongest base, the 9-eicosyl-9-phosphabicyclo[3.3.1]nonane. The precipitate therefrom is centrifuged and collected, and the supernatant solution transferred for precipitation of a mixture of 9-eicosyl-9-phosphabicyclo[3.3.1]nonane and the next most basic phosphine fraction, the 9-eicosyl-9-phosphabicyclo[4.2.1]nonane. The fractional precipitation procedure is repeated an additional time to remove substantially all of the 9- eicosyl - 9 - phosphabicyclo[4.2.1]nonane. The remaining supernatant solution is then preferably passed over a strong-acid ion exchange resin one or two times to insure removal of last traces of tert-phosphine. The solvent of the supernatant solution is then removed by evaporation, e.g., under a stream of nitrogen with mild heating to about 70° C., yielding mainly a white, waxy solid sec-phosphine, eicosyl(octahydropentalyl - 1 - )phosphine. In this manner first is removed the tert-phosphines, 9-eicosyl-9-phosphabicyclo[3.3.1]nonane and 9-eicosyl-9-phosphabicyclo[4.2.1]nonane, in order to obtain the sec-phosphine eicosyl(octahydropentalyl-1-)phosphine in a purity of about 87% or greater. The infrared and nuclear magnetic resonance spectra and the mass spectrometric analysis are consistent with the indicated structure of the sec-phosphine.

Alternatively, hydrocarbon(octahydropentalyl-1-)phosphine is obtained by direct synthesis. From the reaction of diethyl phosphate with 1,5-cyclooctadiene is obtained diethyl (octahydropentalyl-1-)phosphonate, which upon treatment with a reducing agent such as lithium aluminum hydride, a silane or a siloxane is reduced to the novel (octahydropentalyl-1-)phosphine. The primary phosphine (octahydropentalyl-1-)phosphine is then reacted with an olefin, preferably of 10 to 36 carbon atoms and especially of 16 to 30 carbons, in the presence of free radicals to produce the desired secondary phosphine, hydrocarbyl-(octahydropentalyl-1-)phosphine. By way of illustration, from the reaction of (octahydropentalyl-1-)phosphine with eicosene is obtained eicosyl(octahydropentalyl-1-) phosphine.

Suitable and novel catalysts of the invention include the secondary organophosphine-cobalt-carbonyl complexes represented by the empirical formula $$[I_m Co(CO)_n]_x \quad (II)$$

wherein I is the aforedescribed transannular sec-phosphine containing Q, $m$ and $n$ represent positive integers, each having a value of at least 1 and whose sum is 4, and $x$ represents a positive integer from 1 to 3. Preferred catalysts of the above-defined class comprise those wherein Q represents non-acetylenic hydrocarbyl of 10 to 36 carbon atoms and especially of 16 to 30 carbon atoms. It is to be understood that the suitable novel catalysts identified by the foregoing empirical Formula II may comprise two different I ligands and even two or more of the $I_m Co(CO)_n$ groups. For example, in the suitable catalysts the novel complex between cobalt, carbon monoxide and transannnular sec-phosphine ligand may be monomeric in structure or may be composed of several monomeric units. Thus, the novel complex may be present as a dimer, e.g., a bis(sec-phosphine) dicobalt hexacarbonyl such as

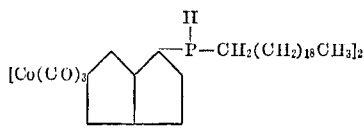

Some of the cobalt may be present as a phosphine cobalt hydrocarbonyl or salt thereof, in which case there will be equilibria between the various molecular forms that are present.

The novel catalysts can be prepared by a diversity of methods. A convenient method is to combine a cobalt salt, organic or inorganic, with the desired phosphine ligand, for example, in liquid phase followed by reduction and carbonylation. Suitable cobalt salts comprise, for example, cobalt carboxylates such as acetates, octanoates, etc. as well as cobalt salts of mineral acids such as chlorides, fluorides, sulfates, sulfonates, etc. Operable also are mixtures of these cobalt salts. It is preferred, however, that when mixtures are used, at least one component of the mixture be cobalt alkanoate of 6 to 12 carbon atoms. The valence state of the cobalt may be reduced and the cobalt-containing complex formed by heating the solution in an atmosphere of hydrogen and carbon monoxide. The reduction may be performed prior to the use of the catalysts or it may be accomplished simultaneously with the hydroformylation process in the hydroformylation zone. Alternatively, the novel catalysts can be prepared from a carbon monoxide complex of cobalt. For example, it is possible to start with dicobalt octacarbonyl and, by heating this substance with a suitable phosphine ligand of the class previously described, the ligand replaces one or more of the carbon monoxide molecules, producing the desired catalyst. When this latter method is executed in a hydrocarbon solvent, the complex may be precipitated in crystalline form by cooling the hot hydrocarbon solution. X-ray analyses of the isolated crystalline solid show the crystalline form of the complex to be a dimer with a linear P—Co—Co—P group in the molecule. This method is very convenient for regulating the number of carbon monoxide molecules and phosphine ligand molecules in the catalyst. Thus, by increasing the proportion of phosphine ligand added to the dicobalt octacarbonyl, more of the carbon monoxide molecules are replaced.

In accordance with the invention, olefinic compounds are hydroformylated to reaction products predominating in primary alcohols by intimately contacting the olefinic compound, especially an olefinic hydrocarbon, in liquid phase with carbon monoxide and hydrogen in the presence of the above-defined catalysts comprising a complex of cobalt with transannular sec-phosphine ligands and carbon monoxide at well defined conditions of temperature and pressure.

Hydroformylation in accordance with the present invention may be carried out at pressures well below 1000 p.s.i.g. to as low as 1 atmosphere or less. Under comparable conditions, the conventional catalyst, dicobalt octacarbonyl, decomposes and becomes inactive. The invention is, however, not limited in its applicability to the lower pressures, and pressures in the range from atmospheric up to about 2000 p.s.i.g. are useful. Even higher ones, such as up to about 5000 p.s.i.g., may be employed. The specific pressure preferably used will be governed to some extent by the specific charge employed, as well as equipment requirements. In general, pressures in the range of from about 3000 to about 1500 p.s.i.g. and particularly in the range of from about 400 to about 1200 p.s.i.g. are preferred. The stability of the catalysts of the present invention at the lower pressure makes the use of pressures below about 1500 p.s.i.g. particularly advantageous.

Temperatures employed will generally range between about 100° and about 300° C. and preferably between about 125° and about 210° C., a temperature of about 150° C. being generally satisfactory. Somewhat higher or lower temperatures may, however, be used.

The ratio of catalyst to the olefin to be hydroformylated is generally not critical and may vary widely. It may be varied to achieve a substantially homogeneous reaction mixture. Solvents are therefore not required. However, the use of solvents which are inert, or which do not interfere to any substantial degree with the desired hydroformylation reaction under the conditions employed, may be used. Saturated liquid hydrocarbons, for example, may be used as solvent in the process, as well as alcohols, ethers, acetonitrile, sulfolane, and the like. Molar ratios of catalyst to olefin in the reaction zone at any given instant between about 1:1000 and about 10:1 are found to be satisfactory; higher or lower catalyst to olefin ratio may, however, be used, but in general, it will be less than 1:1.

The ratio of hydrogen to carbon monoxide charged may vary widely. In general, a mole ratio of hydrogen to carbon monoxide of at least about 1 is employed. Suitable ratios of hydrogen to carbon monoxide comprise those within the range of from about 1 to about 10. Higher or lower ratios may, however, be employed. The ratio of hydrogen to carbon monoxide preferably employed will be governed to some extent by the nature of the reaction product desired. If conditions are selected that will result primarily in an aldehyde product, only one mole of hydrogen per mole of carbon monoxide enters into reaction with the olefin. When the primary alcohol is the preferred product as in the present invention, two moles of hydrogen and one mole of carbon monoxide react with each mole of olefin. The use of ratios of hydrogen to carbon monoxide which are somewhat higher than those defined by these stoichiometrical values is generally preferred.

A signal advantage of the present invention as indicated above and further evidenced by the following example is the ability to effect the direct, single-stage hydroformylation of the olefins to a reaction mixture wherein primary alcohols predominate over the aldehydes and byproduct saturated hydrocarbons. The alcohols obtained from normal olefins are furthermore generally primarily the straight-chain or normal isomers, even though the olefin is an internal normal alkene. By selection of reaction conditions within the above-defined range, it is now possible to obtain a predominant portion of the product in the form of the normal or straight-chain compound rather than as its various branched-chain isomers. Generally, the alcohol is the desired end product and the catalysts defined herein will produce this product under a relatively wide range of conditions. However, by varying the operating conditions within the range described herein, the ratio of aldehyde to alcohol product may be varied somewhat. Adjustment of these variables also permits some control over the particular isomer that will be produced.

A particularly valuable aspect of the invention resides in its ability to effect the direct, single-stage hydroformylation of internal normal olefins, having for example, from 4 to 19 carbon atoms to the molecule to normal terminal alcohols having 5 to 20 carbon atoms to the molecule, respectively. Olefinic hydrocarbon fractions, such as, for example, polymeric olefinic fractions, cracked wax fractions, and the like, containing substantial proportions of internal olefins are readily hydroformylated to fractions of hydroformylated products comprising mixtures of terminal aldehydes and alcohols having one more carbon than the olefins in the charge and wherein these primary alcohols are the predominant reaction product. Such suitable feeds consisting of olefinic hydrocarbon fractions include, for example, $C_7$, $C_8$, $C_9$, $C_{10}$ and higher olefinic fractions as well as olefinic hydrocarbon fractions of wider boiling ranges such as $C_{7-9}$, $C_{10-13}$, $C_{14-17}$ olefinic hydrocarbon fractions and the like.

The reaction mixtures obtained may be subjected to suitable catalyst and product separating means comprising one or more such steps, for example, as stratification, solvent extraction, distillation, fractionation, adsorption, etc. Catalyst, or components thereof, as well as unconverted charge, may be recycled in part or entirely to the reaction zone.

The process of this invention is generally applicable to the hydroformylation of any hydrocarbon compound having at least one aliphatic carbon-to-carbon unsaturation, especially an ethylenic carbon-to-carbon bond. Thus, it is applied to the hydroformylation of olefins, especially monoolefinic hydrocarbons, having, for example, from 2 to 19 carbons to reaction mixtures predominating in aldehydes and alkanols having one more carbon atom than the starting olefin. Monoolefins such as ethylene, propylene, butylene, cyclohexene, 1-octene, dodecene, 1-octadecene and dihydronaphthalene are a few examples of suitable hydrocarbons. Suitable hydrocarbons include both branched- and straight-chain, as well as cyclic, compounds having one or more of these ethylenic or olefinic sites. These sites may be conjugated, as in 1,3-butadiene, or non-conjugated, as in 1,5-hexadiene and bicyclo[2.2.1]hepta-2,5-diene. In the case of polyolefins, it is possible to hydroformylate only one of the olefinic sites or several or all of these sites. The unsaturated carbon-to-carbon olefinic linkages may be between terminal and their adjacent carbon atoms, as in 1-pentene, or between internal chain carbon atoms, as in 4-octene.

The process and novel catalyst of this invention may also be used to hydroformylate ethylenic carbon-to-carbon linkages of non-hydrocarbons. Thus, it is possible to hydroformylate olefinically unsaturated alcohols, aldehydes, and acids to corresponding alcohols, aldehydes, and acids containing an aldehyde or hydroxyl groups on one of the carbon atoms previously involved in the olefinic bond of the starting material; unsaturated aldehydes yield principally diols.

The olefinic charge may comprise two or more of the above-defined suitable olefins. Olefinic hydrocarbon fractions are hydroformylated under the conditions above-defined to mixtures of aldehydes and alcohols in which the alcohols predominate.

Example 1

The reactor was a 300-ml. stainless-steel magnetically stirred autoclave operated at 1250 r.p.m. and connected to a source of a premixed hydrogen-carbon monoxide gas delivered at any desired constant pressure. The catalyst was prepared in situ from cobalt octanoate and transannular sec-phosphine. The components forming the catalyst, i.e., cobalt octanoate and eicosyl(octahydropentalyl-1-)phosphine (purity, 87%), the olefin, 1-dodecene, and alkali, potassium hydroxide, were charge to the reactor. The reactor was closed, evacuated and pressured with $H_2$-CO gas until all foreign gases were displaced. The reactor was then heated under sufficient $H_2$+CO pressure so that the final pressure at reaction temperature was about 1200 p.s.i.g. After the temperature was equilibrated, the pressure reduction was recorded. The reaction conditions and results are tabulated in Table I.

TABLE I.—HYDROFORMYLATION OF 1-DODECENE

Phosphine ligand: Eicosyl(octahydropentalyl-1-) phosphine

| | |
|---|---|
| Cobalt, percent w. | 0.2 |
| Mole ratio: | |
|   Phosphine/cobalt | 1.5 |
|   KOH/cobalt | 0.75 |
|   $H_2$/CO | 2.1 |
| Conditions: | |
|   Temperature, °C. | 183–184 |
|   Pressure, p.s.i.g | 1200 |
|   Time required for 50% conversion, min. | 133 |
| Conversion of 1-dodecene, percent w. | 98.5 |
| Conversion, percent w., to— | |
|   Saturated hydrocarbon | 14.0 |
|   Aldehydes | 0.0 |
|   Primary alkanols | 84.3 |

Of the primary alkanols obtained, 60.4% was the linear, straight-chain n-tridecanol, the remainder branched-chain alkanols.

I claim as my invention:

1. Hydrocarbyl(octahydropentalyl - 1 - )phosphine in which hydrocarbyl represents a non-acetylenic hydrocarbyl group of from 10 to 36 carbon atoms.

2. The phosphine in accordance with claim 1 wherein hydrocarbyl is eicosyl.

References Cited

UNITED STATES PATENTS 3,400,163   9/1968   Mason et al. ____ 260—606.5 P
3,502,730   3/1970   Mason et al. ____ 260—606.5 P TOBIAS E. LEVOW, Primary Examiner W. F. W. BELLAMY, Assistant Examiner U.S. Cl. X.R.

260—439 R